United States Patent [19]

Duncan

[11] 3,973,521

[45] Aug. 10, 1976

[54] STRETCHED TEAT CUP

[76] Inventor: Lloyd P. Duncan, 3 Riverbend Place, Washington, Mo. 63090

[22] Filed: May 12, 1975

[21] Appl. No.: 576,248

Related U.S. Application Data

[63] Continuation-in-part of Ser. No. 449,009, March 7, 1974, abandoned.

[52] U.S. Cl. ............................ 119/14.47; 119/14.49
[51] Int. Cl.² ........................................... A01J 5/04
[58] Field of Search ........... 119/14.49, 14.51, 14.48, 119/14.47, 14.5, 14.36, 14.52

[56] References Cited

UNITED STATES PATENTS

| | | | |
|---|---|---|---|
| 1,256,792 | 2/1918 | Harner | 119/14.47 |
| 3,308,788 | 3/1967 | Noorlander | 119/14.49 |

FOREIGN PATENTS OR APPLICATIONS

| | | | |
|---|---|---|---|
| 159,183 | 10/1954 | Australia | 119/14.49 |
| 112,034 | 12/1917 | United Kingdom | 119/14.49 |
| 161,435 | 4/1921 | United Kingdom | 119/14.48 |

*Primary Examiner*—J.N. Eskovitz
*Attorney, Agent, or Firm*—Mason, Mason & Albright

[57] ABSTRACT

A teat cup has an outer rigid shell and an inner flexible inflation to receive an animal's teat in a pulsating elastic bore which is stretched by a spring or retaining member positioned between the shell and inflation. The stretched upper portion of the inflation becomes more responsive to the pulsations during milking. The spring member is fitted to the inflation near the upper mouth of the bore so that the member's lower portion bears on the inner surfaces of the shell or the spring member's shape inherently stretches the upper inflation area. Notches or openings and/or apertures are provided in the spring member to allow movement of the member as well as drainage of the teat cup when same is washed and inverted to dry.

10 Claims, 13 Drawing Figures

FIG. 9
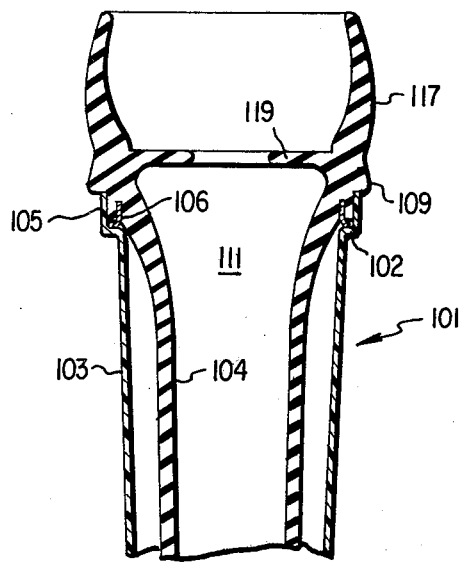
FIG. 10
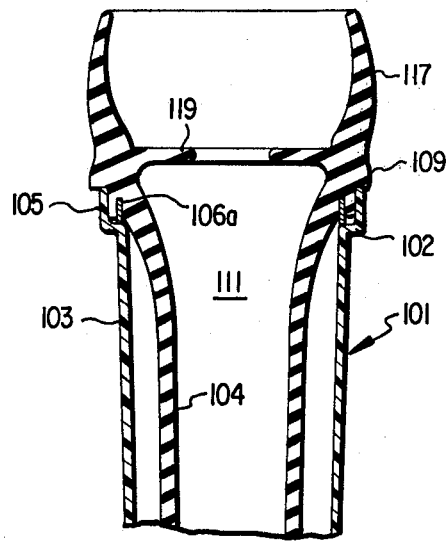
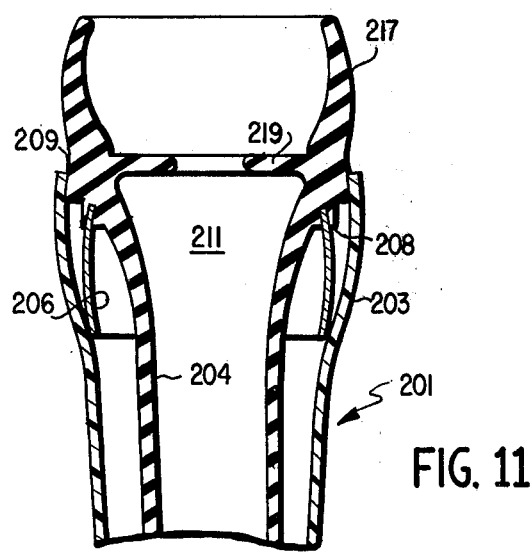
FIG. 11

STRETCHED TEAT CUP

This application is a continuation-in-part of copending application Ser. No. 449,009 filed Mar. 7, 1974, now abandoned.

FIG. 9 is a side elevation of a modified teat cup with the lower part broken away;

FIG. 10 is a side elevation of the FIG. 9 teat cup with a different spring member;

FIG. 11 is a side elevation of a further modified teat cup;

Figure 2:
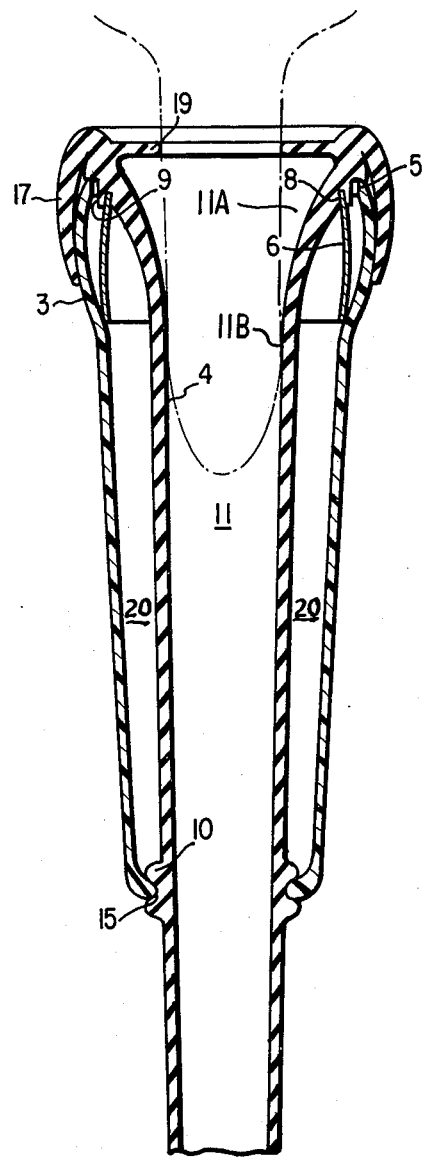
FIG. 2 is a section of the teat cup of FIG. 1 with its parts assembled.

In the drawings, the teat cup 1 includes an outer shell 3 of rigid material such as stainless steel or plastic. An inner flexible liner 4, known as an inflation, fits within the shell 3 as shown in FIG. 2. The lower portion of the inflation 4 has raised ribs 10 between which the edge of apertured bottom 15 of shell 3 is mounted.

The top of shell 3 has rim 5 that defines the mouth of the shell and inflation 4 has a circular shoulder 9 that is clasped by rim 5 when the teat cup is assembled. The foldover flap 17 of inflation 4 serves to hermetically seal the mouth of shell 3 and ribs 10 cooperate with the bottom 15 to seal the shell so that a sealed, enclosed pulsator space 20 is formed between the outer surfaces of inflation 4 and the inner surfaces of shell 3. The inflation 4 is naturally resilient being made of rubber or stretchable plastic so that a resilient bore 11 is provided to receive an animal's teat and, when pulsed and placed under a degree of vacuum, to simulate the sucking massage of a calf's mouth.

It will be appreciated that the inflation 4 should be "alive" to pulsate properly and stimulate the animal being milked. Obviously, the inflation 4 must be resilient and stretched to some extent during each pulse from the pulsator. At the same time, the web 19 that encircles the teat should remain without distortion or bending the teat to retain the teat cup on the animal at the point of bore seal 11B and preserve the vacuum in the bell area 11A. The pulsating vacuum is, of course, carried out via an entrance (not shown) through shell 3 to space 20. When flap 17 is folded over rim 5, the web 19 and bore 11 are stretched only to minor extent in conventional teat cup structures.

In the present invention, a member 6 is fitted on the inflation 4, preferably adjacent rim 5, to spring bias at least the upper part of the bore 11 to a limited degree. The web 19 can have corrugations as disclosed in U.S. Pat. No. 3,696,790, which corrugations remain in a substantially unstretched condition until the teat cup is fitted on an animal. The purpose of spring member 6 is to stretch the upper part of inflation 4 to assist in pulsating vacuum in space 20 and resist the tendency of the inflation to collapse because of the vacuum within bore 11. The member 6 is fitted around the upper part of inflation 4 and it is preferred that the member 6 be ring shaped or plural sided and encircle the bore. The spring member 6 can be rigid plastic, but is preferably of resilient material and can best be made of spring steel and fitted so that its lower portion bears on the upper inner surface of shell 3. Alternatively, the ring member can be configured to inherently stretch the inflation's upper part.

One structure that has been found to be operative includes a downwardly facing groove 8 in the lower surface of shoulder 9. A circular spring member 6 can be inserted in groove 8 and when the inflation 4 is assembled in the shell 3, as shown in FIG. 2, the spring member 6 bears on the inner surface of shell 3 and bends so that the upper inflation bore 11 is stretched which resulted in the inflation being more "alive." The lower edge of the member 6 can be notched to permit some movement when that edge bears on the inner surface of shell 3.

Figure 3:
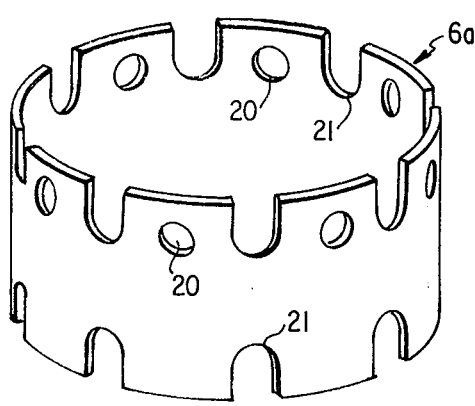
FIG. 3 is a perspective view of one spring member.

The arrangement shown in the drawings is particularly advantageous in that the teat cup is a CIP (cleaned in place) structure that can be washed together with the milking claw, and then inverted with drainage taking place at the teat cup's rim 5 when flaps 17 are unfolded. If the member 6 is left in the teat cup during washing, it can be provided with holes 20 and/or notches 21 which also function as wash and drainage sites as shown in member 6a in FIG. 3. The flap 17 is unfolded and the teat cup inverted as described in U.S. Pat. No. 3,726,253.

Figure 4:
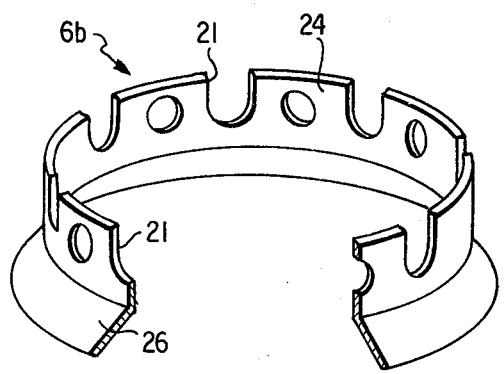
FIG. 4 is a side elevation of still another spring member.

Another form of the member 6 is shown in FIG. 4 as 6b wherein the upper portion 24 has drainage notches 21 which remain exposed when the portion 24 is fitted in groove 8. The lower portion 26 is bent outwardly to flare as a skirt portion which ensures that the member 6b bears on the inner surface of shell 3 and stretches the teat receiving portion of the bore 11.

The effect of the spring member 6 on the upper portion of the inflation 4 including web 19, called the "bell," is to stretch the bore 11 and push the bell upwardly and outwardly. If the member 6 is circular and made to have a slightly larger diameter than that of the groove 8, the member 6 is firmly held in place even after the shell 3 is removed for replacement or complete cleaning.

Figure 5:
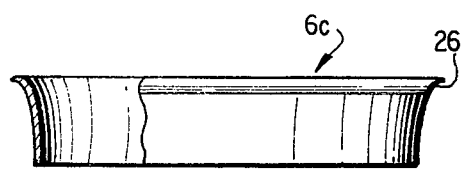
FIG. 5 is a side elevation of another retaining member.
Figure 6:
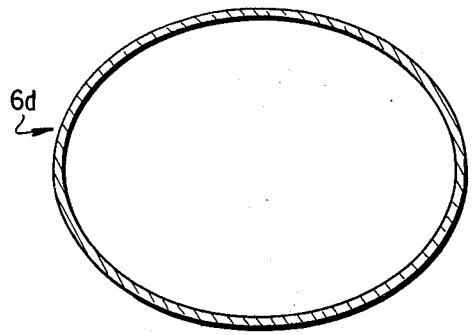
FIG. 6 is a plan view of a further spring member.

On the other hand, a barb 26 at the top of member 6 as shown in FIG. 5 and FIG. 9 can be used to hold and retain member 6c in groove 8 without the support of the shell while stretching the inflation's bell. Alternatively, the member 6d can be oval in configuration as seen in plan in FIG. 6 and is designed to change the friction point 11B of the inflation 4 with respect to the teat and remain in groove 8. The oval shape as shown in FIG. 6 is somewhat exaggerated for illustration purposes.

Changing the pressure points on the inflation 4 changes the stretch properties of the resilient bore 11. This affects the sealing and friction points and consequently, the milking and massage effects are altered. In the structure shown and disclosed herein, these effects are much improved and remain so throughout the life of the inflation.

Figure 7:
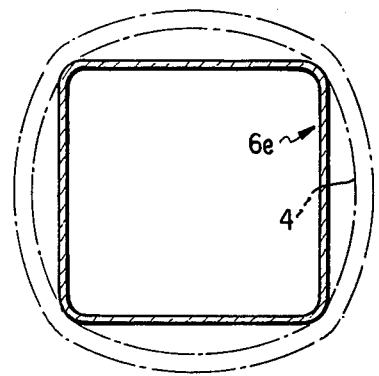
FIG. 7 is a plan view of a still further spring member.
Figure 8:
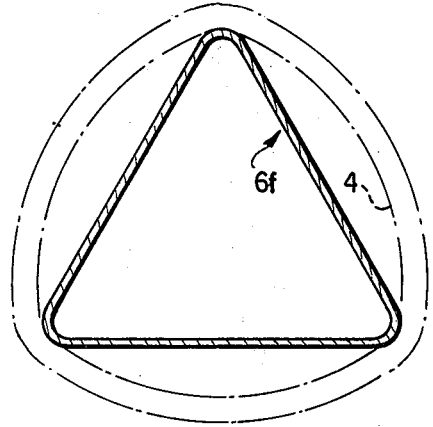
FIG. 8 is a plan view of an additional spring member.

FIGS. 7 and 8 show respectively, a square member 6e in inflation 4 and a triangular member 6f. These plural sided members 6 can also be notched and/or apertured to permit distortion and complete drainage when cleaned in place.

Figure 1:
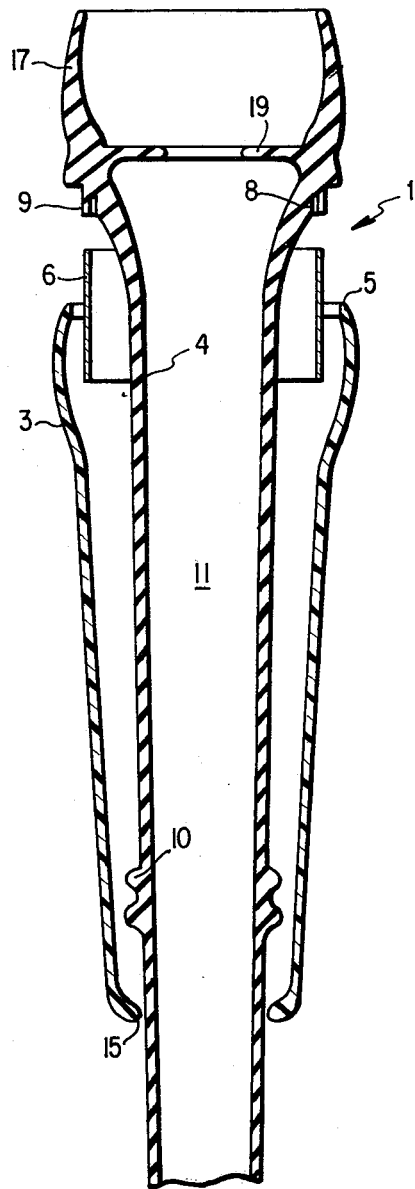
FIG. 1 is an exploded section of the teat cup of the present invention.

In FIG. 9 the teat cup 101 is similar to the FIG. 1 structure in that a shell 103 houses an inflation 104 having a flap 117 that can be folded over rim 105. The shell 103 has an upper flange shoulder 102 while the upper portion of inflation 104 has a stretchable bore 111 to receive an animal's teat. A spring member 106 is held in the upper part of the inflation 104, but the member 106 does not necessarily bear on the inner surface of the shell 103. Instead, the ring member 106 is curved when seen in side elevation somewhat like the FIG. 4 or 5 spring member to stretch the bore 11 in much the same way. The member 106 has a slightly larger diameter or perimeter than that of the groove in shoulder 109 so that member 106 inherently pushes the teat receiving portion of the bore 111 outwardly to a stretched condition. Also, the web 119 remains substantially unstretched when the teat cup 101 is assembled. The member 106 can be left in place during washing and can be apertured to permit complete drainage when the teat cup 101 is inverted and flap 117 unfolded.

In FIG. 10, the teat cup 101 is the same as in FIG. 9, but spring member 106a is used which member is substantially straight when viewed in side elevation. Again the diameter or perimeter of member 106a is slightly larger than the groove in shoulder 109 so that bore 111 is slightly stretched.

In FIG. 11, a teat cup 201 includes an outer shell 203 and inner inflation 204 with spring member 206 fitted in groove 208 near shoulder 209 of the inflation. The inflation has a web 219 and flap 217 which folds over the upper part of shell 203 when assembled for milking. At that time, spring member 206 bears on the inner surface of the shell 203 much as shown in FIG. 2.

The chief difference between the FIG. 2 teat cup and that of FIG. 11 is in the fit between shoulder 209 and rim 205, the former fitting within the latter so that a good seal is formed between the shoulder 209 and rim 205. When the flap 217 is folded over rim 205, the bore 211 is stretched to a substantial degree and can be stretched to the desired degree by varying the dimensions of the inflation and spring member 206 so that a good seal is obtained.

Figure 12:
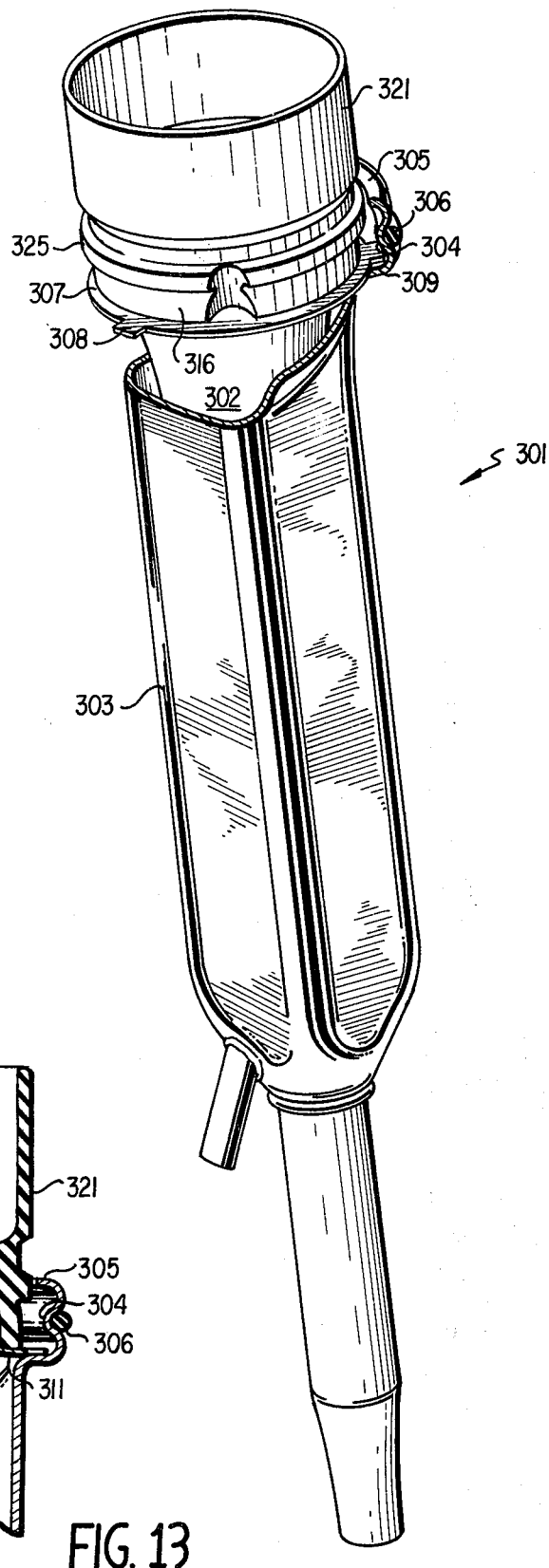
FIG. 12 is a perspective view with parts broken away of a still further teat cup assembly.
Figure 13:
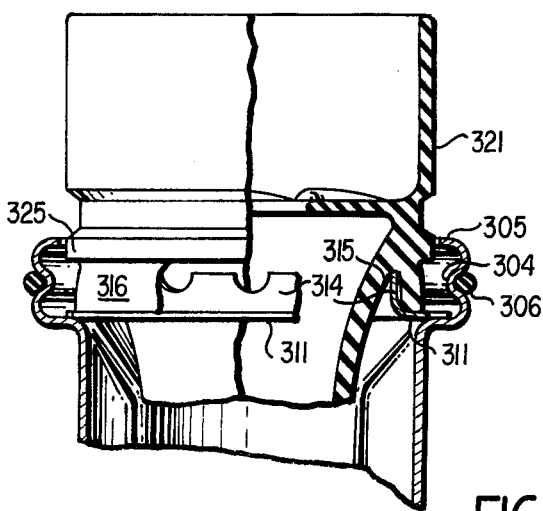
FIG. 13 is a section of the upper portion of the FIG. 12 assembly.

In FIGS. 12 and 13, assembly 301 has inflation 302 within a shell 303 and the latter is flattened in cross section below a round or circular double ribbed rim 305. A groove 304 formed between the ribs of the rim 305 to receive an elastic retaining band 306. Within the upper portion of the shell 303 and adjacent the rim 305, a circular spring member 307 is fitted with tabs 308 that loosely fit within the concave inner surface of the lower rib 309. The spring member has a lower flared portion 311, which includes tabs 308 and an upper portion with a scalloped edge 314 that fits within a circular recess 315 of a lower shoulder 316 of the inflation 302. Again, the bell portion of the inflation 302 is stretched upwardly and outwardly by the spring member 307 when shoulder recess 315 receives that member.

The upper edge of spring member 307 bears on the inner shoulder surface to stretch the bore at the bell of the inflation 302 but the member 307 does not bear on the inner surface of shell 303. The edge 314 has a slightly larger diameter than that of recess 315 when the inflation is in a relaxed state so that upon assembly, the inner surface and bore of the inflation is stretched upwardly and outwardly.

The member 307 is preferably stainless steel and movable when the flap 321 of the inflation 302 unfolded and shoulder 316 disengated from member 307 during washing and drying. Notches are formed in lower shoulder 316 and raised rib 325, located immediately above shoulder 316 on inflation 302, to allow drainage when the assembly 301 is inverted. Raised rib 325 snugly fits within the mouth of the shell rim 305 when milking.

As used in the specification and claims, spring and spring members refers to members 6, 6a, etc. which are fitted to stretch the teat cup's inflation at the upper part of the bore. In other words, the members 6, 6a, etc. can be rigid but are preferably inherently resilient and serve as a spacer to spring the inflation to a stretched condition. The members can be an integral part of the teat cup parts or, more preferably, a removable ring that can be inserted in a groove in the inflation. In either case, the members are fitted so as to bear on the inflation to stretch the bore.

The above description and drawings disclose several embodiments of the invention. Specific language has been employed in describing the several figures. Nevertheless, it is to be understood that no limitations of the scope of the invention is thereby contemplated for the various alterations and modifications may be made as may occur to one skilled in the art to which the invention relates.

What is claimed is:

1. A teat cup comprising an outer, substantially rigid shell and a inner, elongated flexible inflation, said shell having an upper rim that defines the mouth of said shell and an apertured bottom, a flap of said inflation extending through the mouth and being foldable over said rim to provide a seal, said inflation extending through an aperture adjacent the bottom of said shell to define a resilient bore and leave a sealed pulsator space between the inner surface of the shell and the outer surface of the inflation, spring means positioned around the upper portion of said inflation within said space, said spring means being fitted on said inflation near the upper end thereof and biasing the teat receiving portion of said bore upwardly and outwardly in a stretched condition during milking operation.

2. The teat cup of claim 1 wherein said spring means is an encircling spring member of resilient material, said spring member extending downwardly and bearing on the inner surface of said shell.

3. The teat cup of claim 1 wherein the upper portion of said inflation is bell-shaped and includes a shoulder that abuts the rim of said shell, said shoulder having a groove that encircles the bore adjacent said rim, the upper part of said encircling spring member being inserted in said groove.

4. The teat cup of claim 3, wherein the spring member is plural sided when viewed in plan.

5. The teat cup of claim 3 wherein the spring member is oval in shape when viewed in plan.

6. The teat cup of claim 1 wherein the spring means is an encircling member and said member is bent to have a lower flared part.

7. The teat cup of claim 6, wherein said spring member is apertured to permit washing and drainage when the spring member is left in place.

8. The teat cup of claim 1, wherein said spring means has an upper edge with a barb, the upper portion of said inflation being bell-shaped and including a shoulder that abuts the rim of said shell, said barb being retained by said inflation adjacent said shoulder.

9. A teat cup comprising an outer, substantially rigid shell and an inner, elongated flexible inflation, said shell having an upper rim that defines the mouth of said shell and an apertured bottom, a flap of said inflation extending through the mouth and being foldable over said rim to provide a seal and define a resilient bore, the upper portion of said inflation being bell-shaped with a surrounding shoulder and said shoulder abutting said rim within the mouth of said shell, said inflation extending through an aperture of the bottom of said shell, to leave a sealed pulsator space between the inner surface of the shell and the outer surface of the inflation, spring means positioned around the upper portion of said inflation within said space, said spring means being fitted on said inflation near the upper end thereof and biasing the bell-shaped teat receiving portion of said bore upwardly and outwardly in a stretched condition during milking operation.

10. The teat cup of claim 9, wherein said upper bell-shaped portion includes a teat receiving web, said web and said bore being stretched by said spring means.

* * * * *